July 12, 1955
J. SEVERANCE
2,712,785
ROTARY CULTIVATOR
Filed Dec. 27, 1949
4 Sheets-Sheet 2
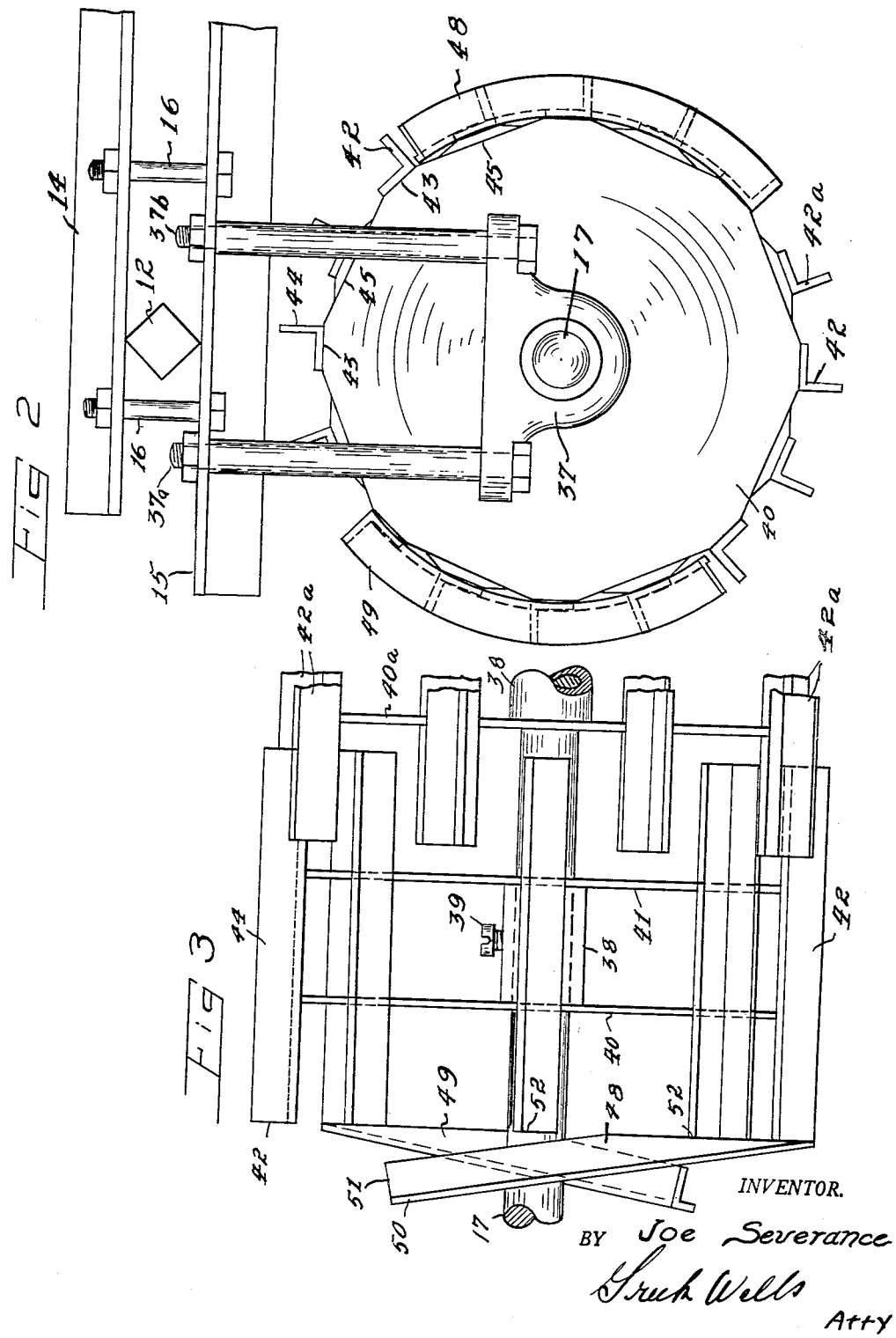
INVENTOR.
BY Joe Severance
Fruh Wells
Atty July 12, 1955  J. SEVERANCE  2,712,785
ROTARY CULTIVATOR
Filed Dec. 27, 1949  4 Sheets-Sheet 3

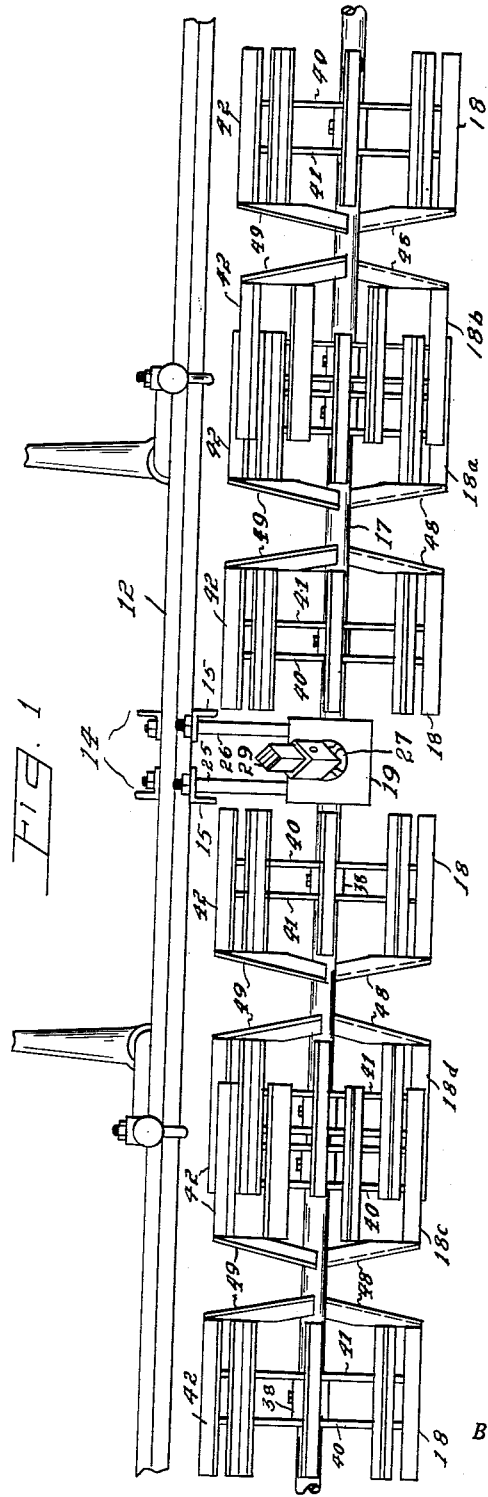

INVENTOR.
Joe Severance
BY Gruhl Wells
Atty

July 12, 1955  J. SEVERANCE  2,712,785
ROTARY CULTIVATOR
Filed Dec. 27, 1949  4 Sheets-Sheet 4
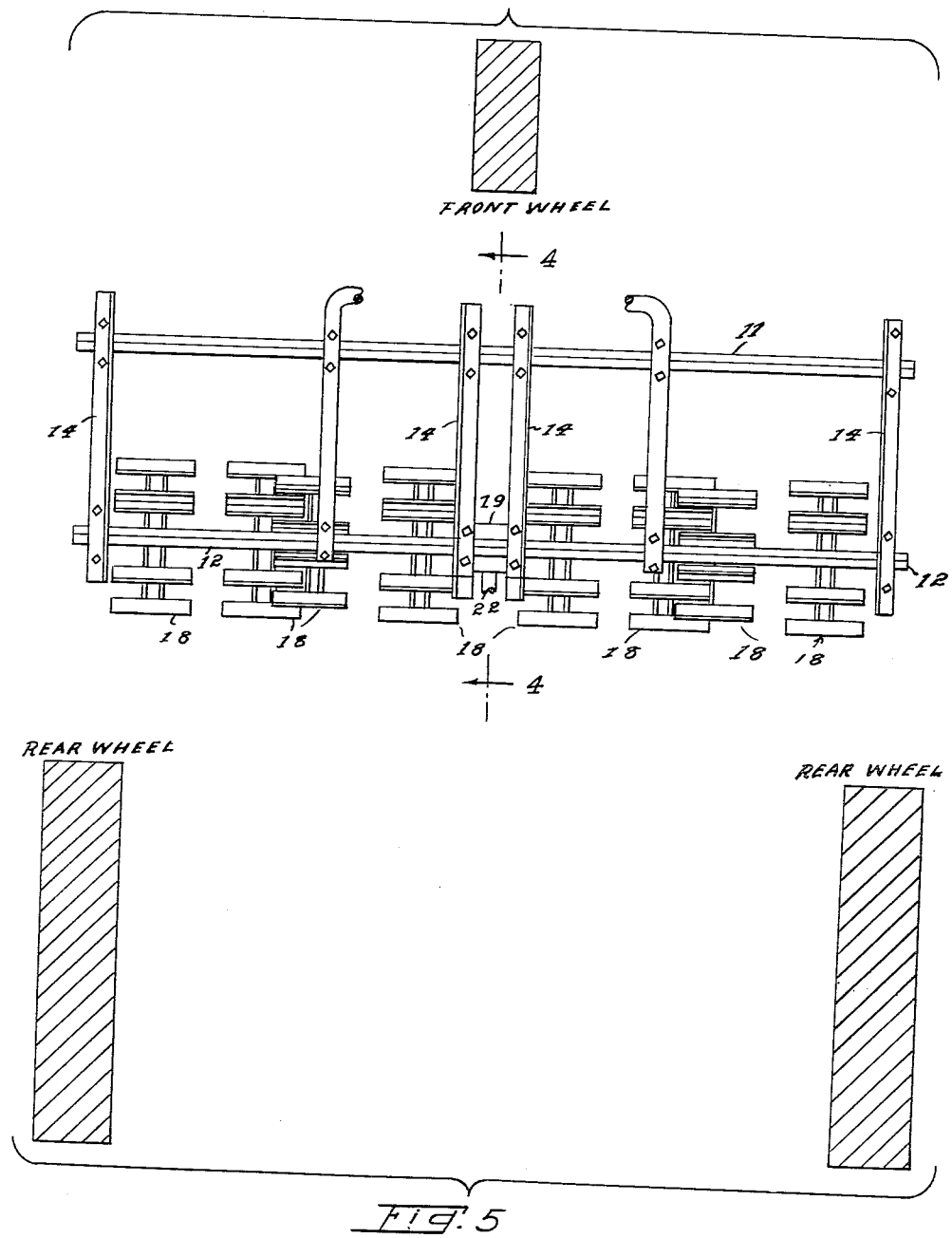
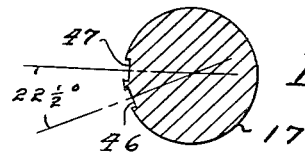
INVENTOR.
Joe Severance
BY
Atty.

United States Patent Office 2,712,785
Patented July 12, 1955

2,712,785

ROTARY CULTIVATOR

Joe Severance, Boise, Idaho

Application December 27, 1949, Serial No. 135,145

2 Claims. (Cl. 97—215)

The present invention relates to improvements in a rotary cultivator.

The preparation of soil for seeding and the cultivation of the soil after seeding presents a difficult problem. It is desirable to prepare the field in advance of planting so as to create a mulch for the seed bed. Oftentimes after the field is prepared rain will fall and create a crust on the surface. The weed seed will start to grow in the crust. It is then necessary to break up the crust and destroy the weed growth. In present practice it is customary to use a disk or some similar implement to loosen the soil and then to use harrows, levelers or packers to pulverize the surface soil and produce the mulch for the seed bed.

After the seed is planted different operations may be necessary depending upon the type of crop. Some crops are planted with a hill or mound over the seeded row to hold the moisture around and over the seed in order to insure good germination. After the seed has sprouted the hill must be removed in order to permit the seed stems to break through. Harrows have been used for this purpose by driving crosswise of the rows, however, if the soil is moist due to rain, considerable damage may result because the soil builds up on any drag tool causing it to go too deep. Even when the crop is above the ground surface it is very tender at first. If cultivated with the usual sliding tools tender crops may be damaged by crusted soil being heaved out on the plants. Some plants require the soil to be hilled up around them for best results, while others may require the soil to be removed away from them slightly.

These several problems of preparing and cultivating soil for row crop planting have necessitated in the past the use of a variety of implements. It is the purpose of the present invention to provide a novel cultivating implement which can be used for the preparation of the seed bed for planting and subsequently for the cultivation of the surface soil to maintain a proper mulch and to level or to hill the soil about the plants. The same cultivating implement is also adapted for use in thinning plants such as beet and lettuce crops by blocking out or spacing the plants by removing the surplus plants.

More particularly it is a purpose of my invention to provide a rotating bladed cultivator wherein the several units of the cultivator are so constructed that they may be readily adjusted to varying spacing of the rows of different crops, together with means for power driving the rotary cultivator in such a way that the surface soil is actually shifted rearwardly along the rows and broken up with lateral shifting of the soil toward and away from the rows only when desired.

It is a further purpose of the invention to provide a novel rotor construction for a rotary cultivator whereby the blades of the rotor are so mounted as to facilitate nesting or overlapping of two adjacent rotors to provide for variation in row spacing.

Another and more particular purpose of my invention is to provide a novel blade arrangement for rotary cultivators whereby the hilling of the soil around the plants in a row is readily accomplished.

The nature and advantages of my invention will appear more fully from the following description and accompanying drawings illustrating a preferred form of the invention. It should be understood however, that the drawings and description are illustrative only and are not intended to limit the invention except insofar as it is limited by the claims.

In the drawings:

Figure 1 is a rear end view of the cultivator illustrating the assembly of rotors upon a power driven shaft for operating between rows of different width;

Figure 2 is an end view on an enlarged scale of the rotor illustrating how it is mounted on the supporting framework;

Figure 3 is a view looking at Figure 2 from the right side and illustrating the nesting of two adjacent rotor units;

Figure 5 is a plan view of the cultivator illustrating its position in connection with the wheels of a supporting tractor; and Figure 6 is a detailed view illustrating the construction of the rotor shaft.

Figure 4:
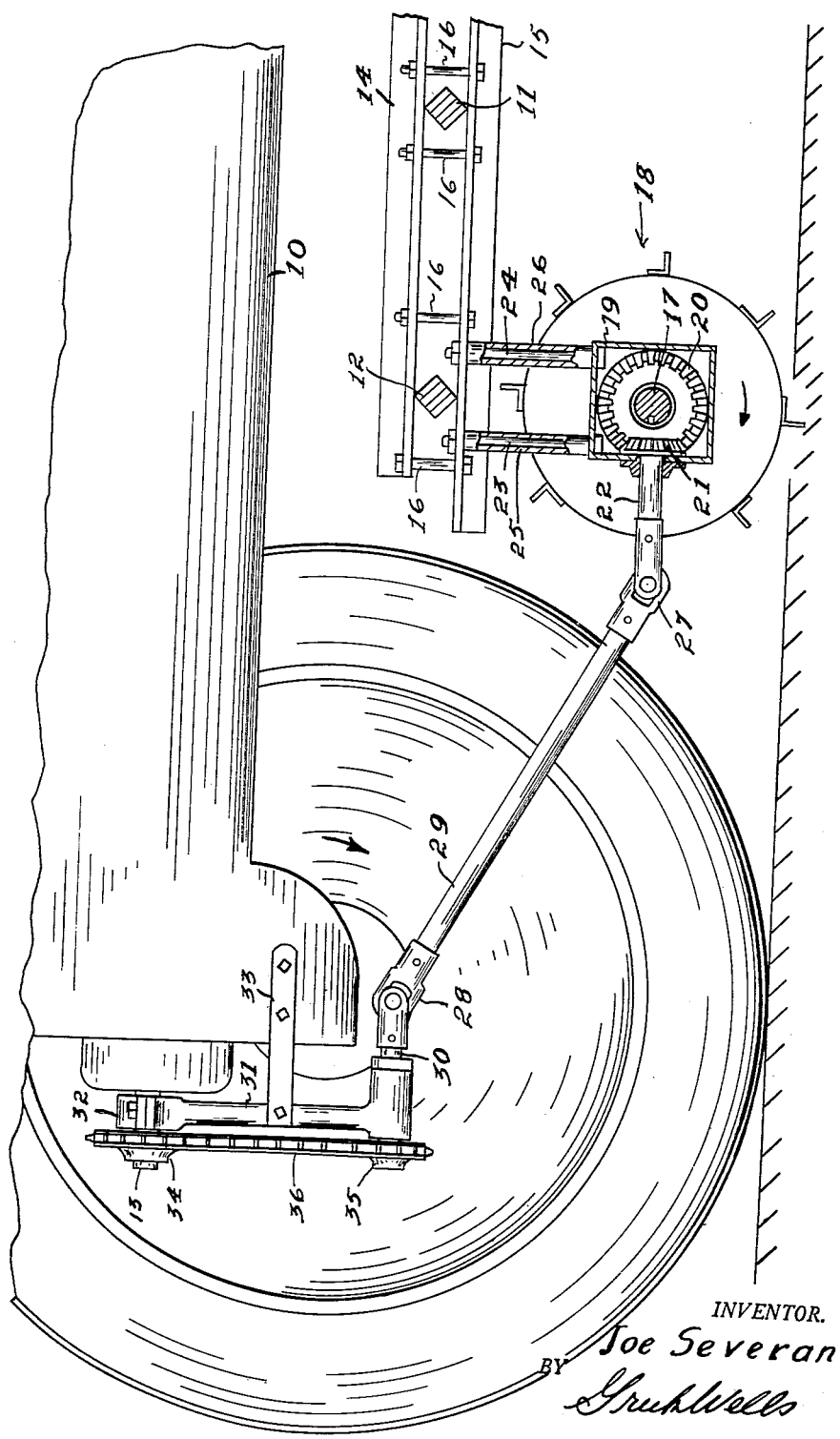
Figure 4 is a sectional view taken substantially on the line 4—4 of Figure 1 to illustrate the power connection to the rotor shaft.

Referring now in detail to the drawings and particularly to Figures 1–5, my invention is illustrated in connection with a tractor 10 which may be of any of the well known type of farm tractors. It is common practice to provide attachment for these farm tractors to which cultivators such as the usual plow or disk elements can be attached. One common form of attaching means comprises two spaced apart bars 11 and 12 which are so mounted between the front and rear wheels of the tractor that they may be raised and lowered with respect to the tractor to control the depth of cultivation. This cultivator attaching means forms no part of the present invention since my invention is embodied in a cultivating implement which is clamped to the attachment bars 11 and 12 and which receives its power from the power take off shaft 13 of the tractor. Figure 4 of the drawings illustrate the manner of connecting my improved cultivator to the supporting bars 11 and 12 and to the power take off shaft 13.

A connecting framework composed of upper members 14 and lower members 15 bolted together by bolts 16, is clamped on the bars 11 and 12. A drive shaft 17 for cultivator rotors 18 is suspended from the lower members 15 of the framework. At the center of the cultivating implement a gear box 19 is provided to house a gear 20 and a drive gear 21. The gear 20 is fixed on the shaft 17 while the gear 21 is fixed to a shaft 22 that projects rearwardly through the gear box 19. Bolts 23 and 24 and spacing tubes 25 and 26 are used to secure the gear box 19 to the lower frame member 15 at the middle of the implement. The shaft 22 is connected by two universal joints 27 and 28 and an intermediate shaft 29 to a driven shaft 30 that is journalled in the lower end of an arm 31. The arm 31 is pivotally suspended by a suitable bearing block 32 on the power take off shaft 13 of the tractor. A brace 33 connects from the tractor housing to the arm 31 to keep it from swinging about the shaft 13. Two sprocket wheels 34 and 35 and a chain 36 connect the take off shaft 13 to the shaft 30. Any desired gear ratio may be used to give the proper speed for the shaft 17 that carries the cultivator rotors. I prefer to drive the rotors at a surface speed which is about twice the surface speed of the tractor over the ground to be cultivated and I prefer that the direction of rotation of the cultivator rotors be the same as that of the wheels of the tractor so that the power on the rotors tends to advance the tractor rather than retard its movement.

Referring now to Figures 1, 2 and 3 in particular, these figures illustrate the arrangement of the several rotors 18 upon the drive shaft 17. They also illustrate the construction of the individual rotors and the manner in which adjacent rotors cooperate to provide adjustment of the cultivator to different row spacing that may be used for particular crops. It may be necessary in some instances to cultivate a row crop where the individual rows are rather widely spaced at intervals to provide for irrigation ditches between them and more closely spaced between the irrigation ditches. According to my invention, I arrange the cultivator so that the power connection and the gear box 19 are located centrally of the cultivator so that in an irrigated field the center of the cultivator may coincide with the ditch and adjacent rotors 18 may be used to cultivate the soil between the ditch and the adjacent plant rows without filling the ditch. The next adjacent pairs of rotors 18a and 18b on the right and 18c and 18d on the left may have to cultivate a much narrower space between the rows than the space allowed for the irrigation ditch. The construction is such that the rotors may nest as shown in Figure 1, so as to provide for any desired spacing from the length of a single rotor upward. Two rotors when nested are approximately one and one-third times the length of a single rotor. The construction of the rotors is such that for any particular cooperation need the standard length of rotors may be shortened where the length of a single rotor would be too great.

The rotor shaft 17 is supported at the center by the gear box 19 and is supported at its ends by suitable bearing blocks 37 which are connected by bolts 37a and 37b to the end frame members 15. The individual rotors each comprise a central hub 38 which is adapted to be secured to the shaft 17 by set screws 39. Two mounting disks 40 and 41 are welded to the ends of the hub 38 and provide the support for a multiplicity of blades 42. Preferably I employ 8 blades for each rotor, spacing the blades 45 degrees apart and welding them to the disks 40 and 41. The blades are readily constructed of angle iron of the right dimension and the disks are cut flat as indicated at 43 in Figure 2, so that the angle irons will fit flat against the disks for welding and will provide a soil engaging face 44 that is substantially radial to the axis of the rotor. Between the flat surfaces 43 to which the blades 42 are secured, the disks are cut straight as indicated at 45 in Figure 2 so that the blades 42a of an adjacent rotor may overlap or nest with the blades 42.

As a further means of facilitating the nesting of the blades of two adjacent rotors the shaft 17 is formed as shown by Figure 6 with set screw receiving faces 46 and 47 that are arranged approximately twenty-two and one-half degrees apart around the shaft. This serves to facilitate ready positioning of two adjacent rotors when they are to be nested as illustrated at 18a and 18b in Figure 1 and in Figure 3.

In order to take care of the matter of hilling up the soil slightly around certain row crops, I provide an additional blade or blades on certain of the rotors. These blades are illustrated at 48 and 49 in Figure 1 of the drawings. Figure 2 illustrates the blades 49 as they appear when viewed from the end of the rotor. Each of the blades 48-49 comprises a section of angle iron which is curved in one direction to conform to the circle on which the rotor blades 42 are mounted with the flange 50 of the curved blade facing away from the rotor and the flange 51 following the contour of the rotor. One end of the blade 49 is welded directly to a blade 42 and the flange 51 is cut so that a second point 52 of attachment to another blade 42 is provided at a distance from the end of the blade 49. The free end of the blade 49 is spaced axially from the ends of the parallel rotor blades. It is obvious that with this construction rotation of the rotor will cause the blades 48 and 49 to move the soil endwise of the rotor toward the adjacent blades.

For some purposes it is desirable to reverse the process and move the soil inwardly toward the rotor rather than away from the rotor. With the direction of rotation of the shaft 17 remaining the same, this can be accomplished by reversing the rotors end for end on the shaft 17 so that the free ends of the blades 48 and 49 will enter the soil first and thus scrape the soil toward the parallel blades of the rotor which in turn spread and pulverize the soil.

In order that the operation of my improved cultivator will be more readily understood the following description is given to illustrate how the cultivator is used for conditioning the soil before and after planting. Before planting, to get a well prepared seed bed, the implement is attached to the bar 11 and 12 and the rotors 18 are spaced on the shaft 17 so as to strike the soil where the planter shoe will place the seed. When the tractor is driven across the field the several rotors will move all of the soil in the planting area to a controlled depth. Since the rotors travel substantially twice as fast as the tractor the blades 42 will move down into the soil and shove a portion of the soil rearwardly with each blade. That is, the soil is shifted on the surface lengthwise of the rows a small amount and is well broken up and mulched by the blades as it is shifted. If desired, the planter may be trailed behind the tractor to seed the crop at the same time the soil is mulched. In replanting this operation also takes out any weeds or stray plants at the time of replanting.

For some crops the planter is provided with small disks behind the seed spout or planter shoe to hill up the soil over the seeded row in order to conserve enough moisture for sprouting the seed. This hill has to be removed after the seed has sprouted so the cultivator is adjusted to a very small depth and again used to level the soil and leaves a well mulched area on each side and over the row.

For clean crop cultivation it is essential to start cultivating as soon as the operator can follow the row of plants after they are through the surface. For this operation the rotors are spaced on the shaft 17 to allow the plants to go between the rotor ends. If no hilling operation is desired rotors without blades 48—49 are used. The adjacent rotors are nested the necessary amount to permit them to cultivate closely to the blades and secured on the shaft 17 with the proper spacing. As an example of the adaptability of the rotor, a single rotor with 8 and one-half inch blades would cultivate a strip eight and one-half inches wide. By nesting the rotors the distance can be expanded from about twelve inches to twice the length of the blade and for greater distance three or more rotors can be used between rows. Since the blades are at right angles to the rows they have very little tendency to throw soil away from the ends of the rotors and cultivation can be carried out very close to the plants without injury. If the soil is to be pushed in around the plants rotors with the blades 48—49 are used.

The action of the power driven rotors is to move a small amount of soil downwardly and straight back as each blade of the rotor enters the soil. If there is trash or crust on the surface, it is not lifted so as to tear out the adjacent plants but is shoved downwardly and rearwardly in such a fashion as to tend to break it up. Growing weeds are broken off and the tops are moved rearwardly so that they are generally destroyed.

The spiral blades 48 and 49 operate effectively to break up the crust in crop rows. Opposing spiral blades on opposite sides of a row of plants exert pressure laterally on the soil in the row. The soil is shifted in one direction by one set of blades and slightly back by the opposing set. Since the blades 48 and 49 have a surface speed much higher than the ground travel speed, the soil is swept repeatedly by the blades. The surface soil is lifted slightly and moved toward the row by the sweeping action of the blades 48 and 49. This action is effective to destroy the weeds in early cultivation since they are generally shallow rooted. The crop plants have deeper roots because the seeds are planted an inch or more beneath the ground, so the soil disturbance doesn't destroy them.

The rotors with the spiral blades 48 and 49 are effective with crops such as cotton that are planted in wide lister furrows that are several inches deep. The rotors work in these furrows so the blades 48 and 49 can push the well mulched soil inward and beneath the leaves of the plants. Gradually with repeated cultivations, the rotors are spread apart and the furrow is filled and the soil is hilled up beneath the cotton plants.

The cultivator has an additional use that has not heretofore been mentioned. With certain crops such as sugar beets and lettuce the initial planting is in a continuous row but after the plants are up it is necessary to thin them out so that each plant is spaced from the adjacent plants a matter of several inches. By properly spacing the rotors on the shaft 17 the cultivator can be driven crosswise of the rows to remove the surplus plants, leaving uniformly spaced plants and cultivating the soil between the plants at the same time.

It is believed that the nature and advantages of my invention will be apparent from the foregoing description. Having thus described my invention, I claim:

1. A cultivating rotor comprising a hub, spaced disks secured to the ends of said hub, the disks having their peripheral edges cut alternately on straight lines substantially tangent to a large and a smaller circle about the axis of the hub providing alternate short and long straight edge portions, a plurality of parallel rotor blades around the disks, the blades having mounting flange portions at right angles to the disk radius fixed on said short edge portions of the disks, said blades extending lengthwise beyond the ends of the hub a distance at least equal to the distance between disks whereby to extend over the long straight edge portions of the disks of an adjacent rotor and a spreader blade at one end of the rotor curved helically about the rotor axis on a radius equal to the radius of the circle on which the parallel blades are arranged, the spreader blade having a tapered flange at one end abutting the ends of at least two of said mounting flange portions of the parallel blades and fixed thereto, the other end of the spreader blade being spaced from the ends of the parallel blades.

2. A cultivating rotor comprising a hub, spaced disks secured to the ends of said hub, the disks having their peripheral edges cut alternately on straight lines substantially tangent to a large and a smaller circle about the axis of the hub providing alternate short and long straight edge portions, a plurality of parallel rotor blades around the disks, the blades having mounting flange portions at right angles to the disk radius fixed on said short edge portions of the disks, said blades extending lengthwise beyond the ends of the hub a distance at least equal to the distance between disks whereby to extend over the long straight edge portions of the disks of an adjacent rotor, and two helical spreader blades at one end of the rotor, the spreader blades being on opposite sides of the rotor axis and each extending substantially less than halfway around the rotor, each spreader blade being curved helically about the rotor axis on a radius equal to the radius of the circle on which the parallel blades are arranged, the spreader blade having a tapered flange at one end abutting the ends of at least two of said mounting flange portions of the parallel blades and fixed thereto, the other end of the spreader blade being spaced from the ends of the parallel blades.

References Cited in the file of this patent

UNITED STATES PATENTS

| Number | Name | Date |
|---|---|---|
| 421,128 | Emery | Feb. 11, 1890 |
| 458,217 | Burke | Aug. 25, 1891 |
| 827,329 | Teaby | July 31, 1906 |
| 1,364,720 | Cook | Jan. 4, 1921 |
| 1,543,515 | Pickard | June 23, 1925 |
| 1,690,252 | Schumacher et al. | Nov. 6, 1928 |
| 1,699,151 | Miller et al. | Jan. 15, 1929 |
| 1,715,355 | Graf | June 4, 1929 |
| 1,880,113 | Smith | Sept. 27, 1932 |
| 2,279,652 | Beard | Apr. 14, 1942 |
| 2,569,464 | Edwards | Oct. 2, 1951 |

FOREIGN PATENTS

| Number | Country | Date |
|---|---|---|
| 88,028 | Sweden | Dec. 1, 1936 |
| 57,519 | Denmark | Jan. 26, 1939 |